June 7, 1960

C. I. CLAUSING ET AL 2,939,930

MOTOR CLOSING MECHANISM FOR CIRCUIT BREAKERS

Filed May 22, 1957

INVENTORS
CHALLISS I. CLAUSING
FRANK J. POKORNY

BY
*Ostrolenk, Faber,*
*Gerb & Soffen*

ATTORNEYS

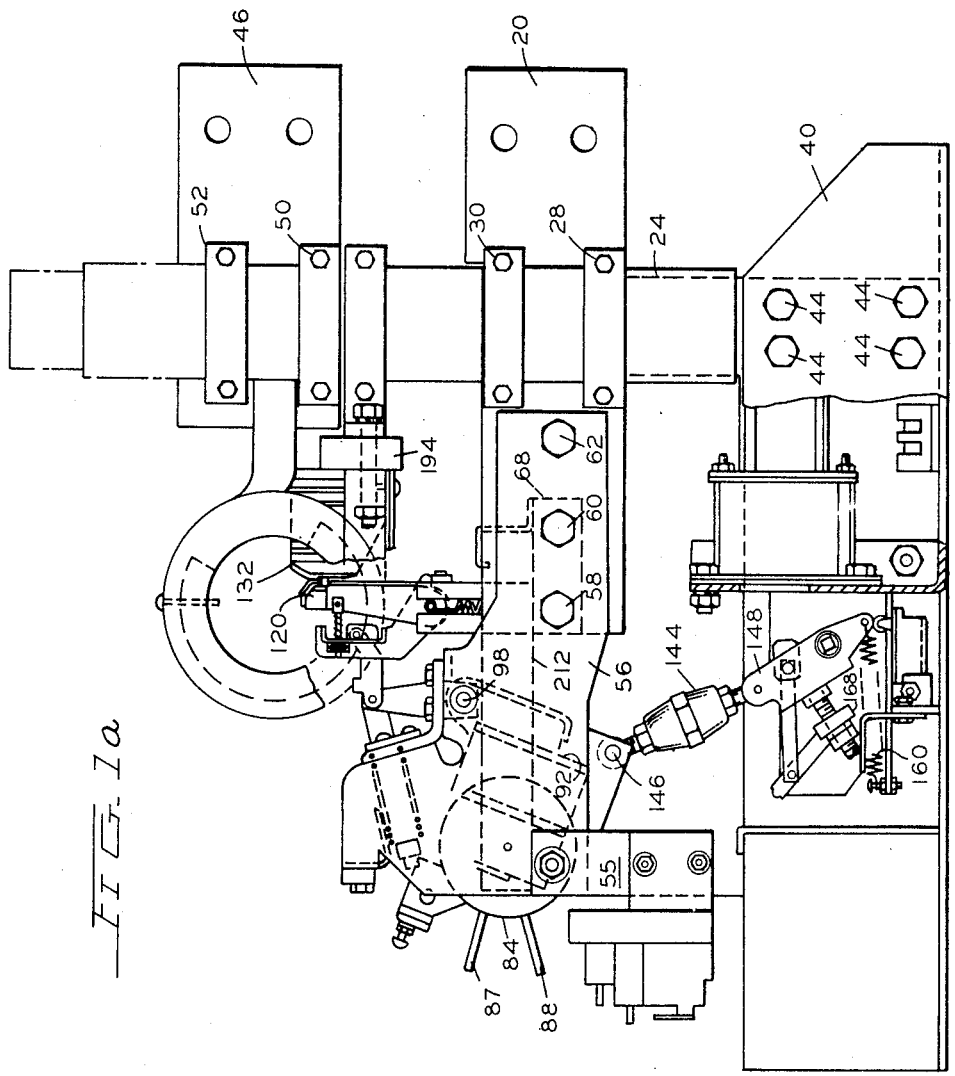

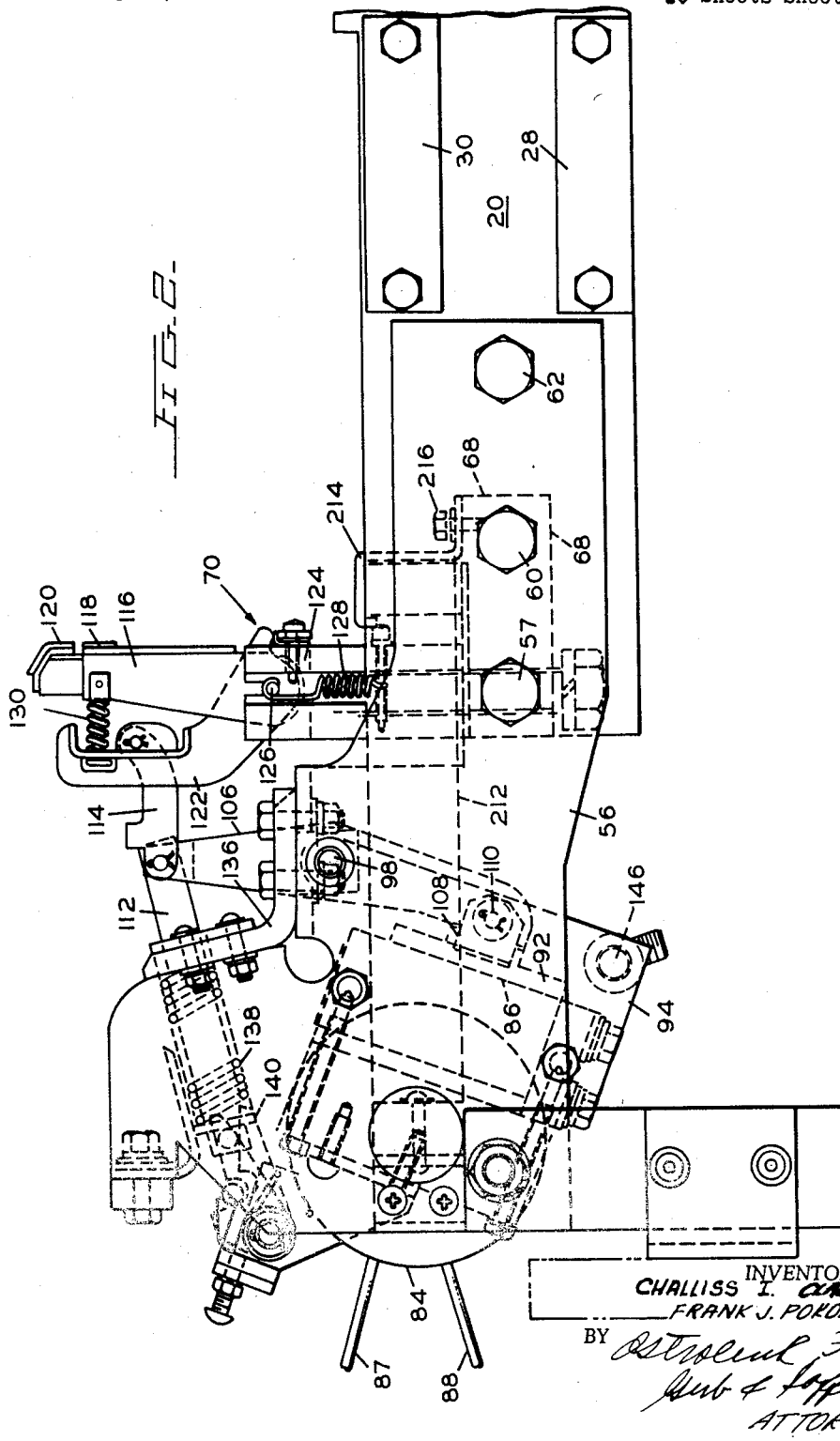

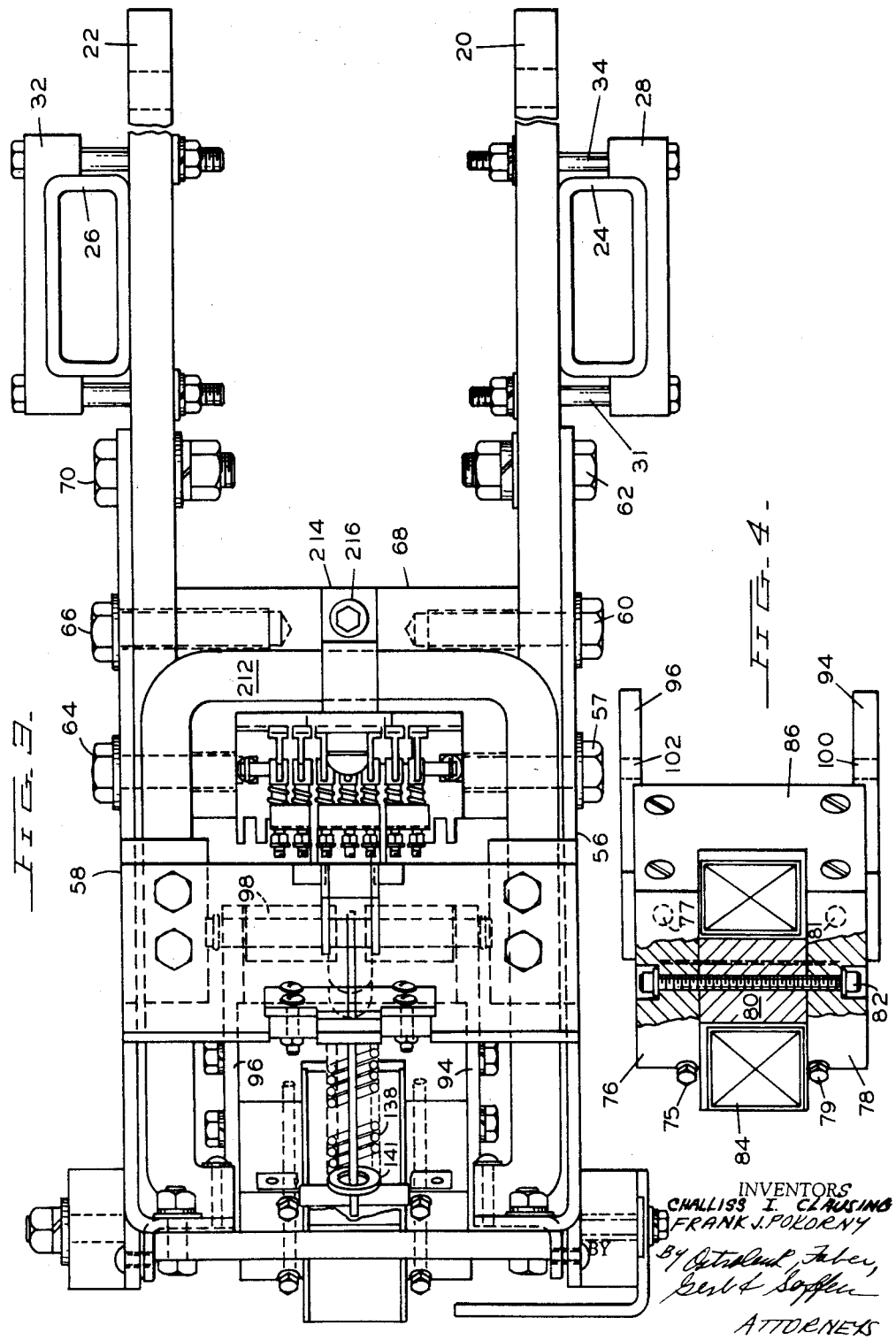

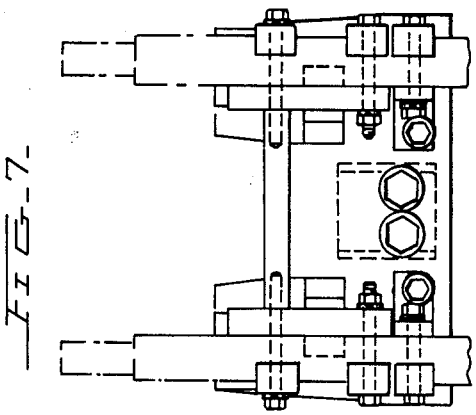
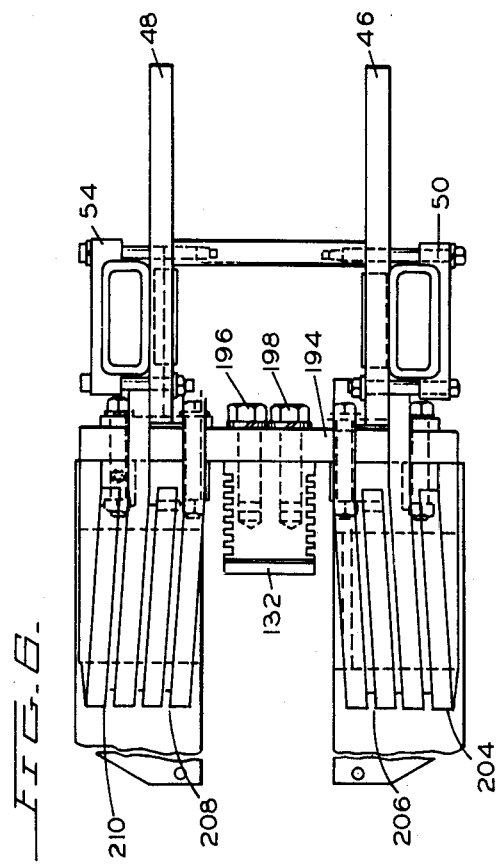
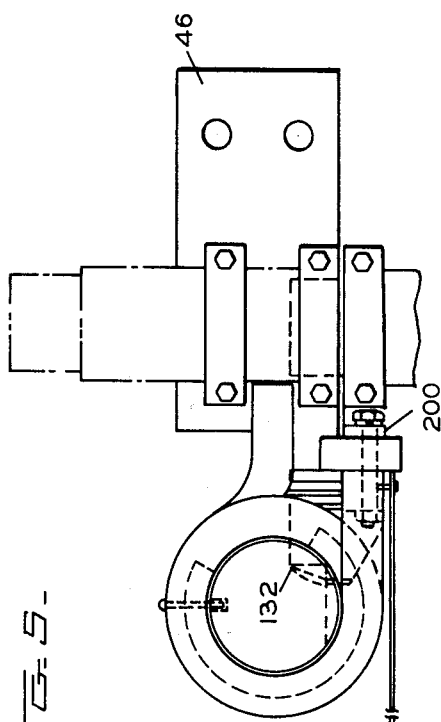

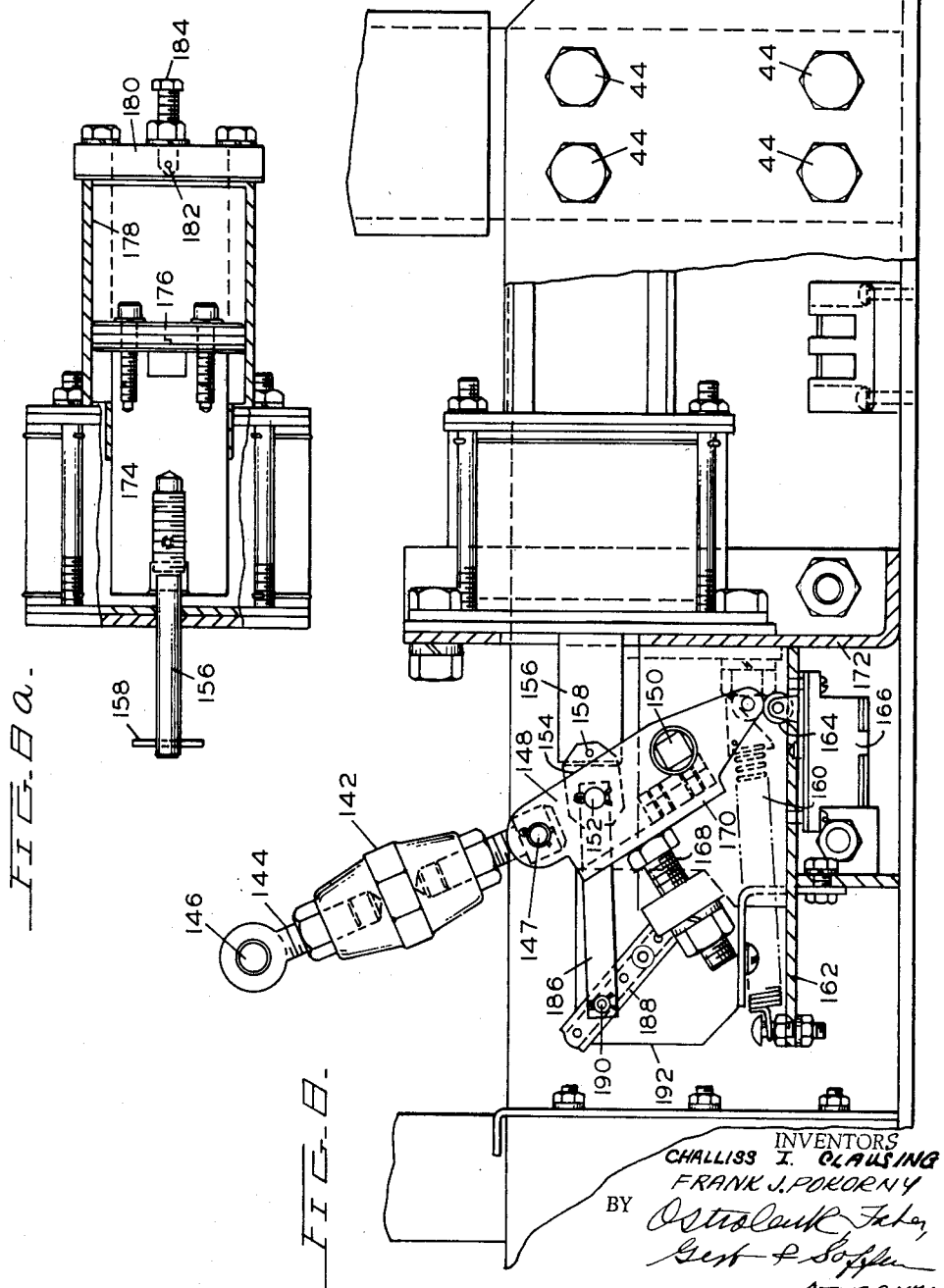

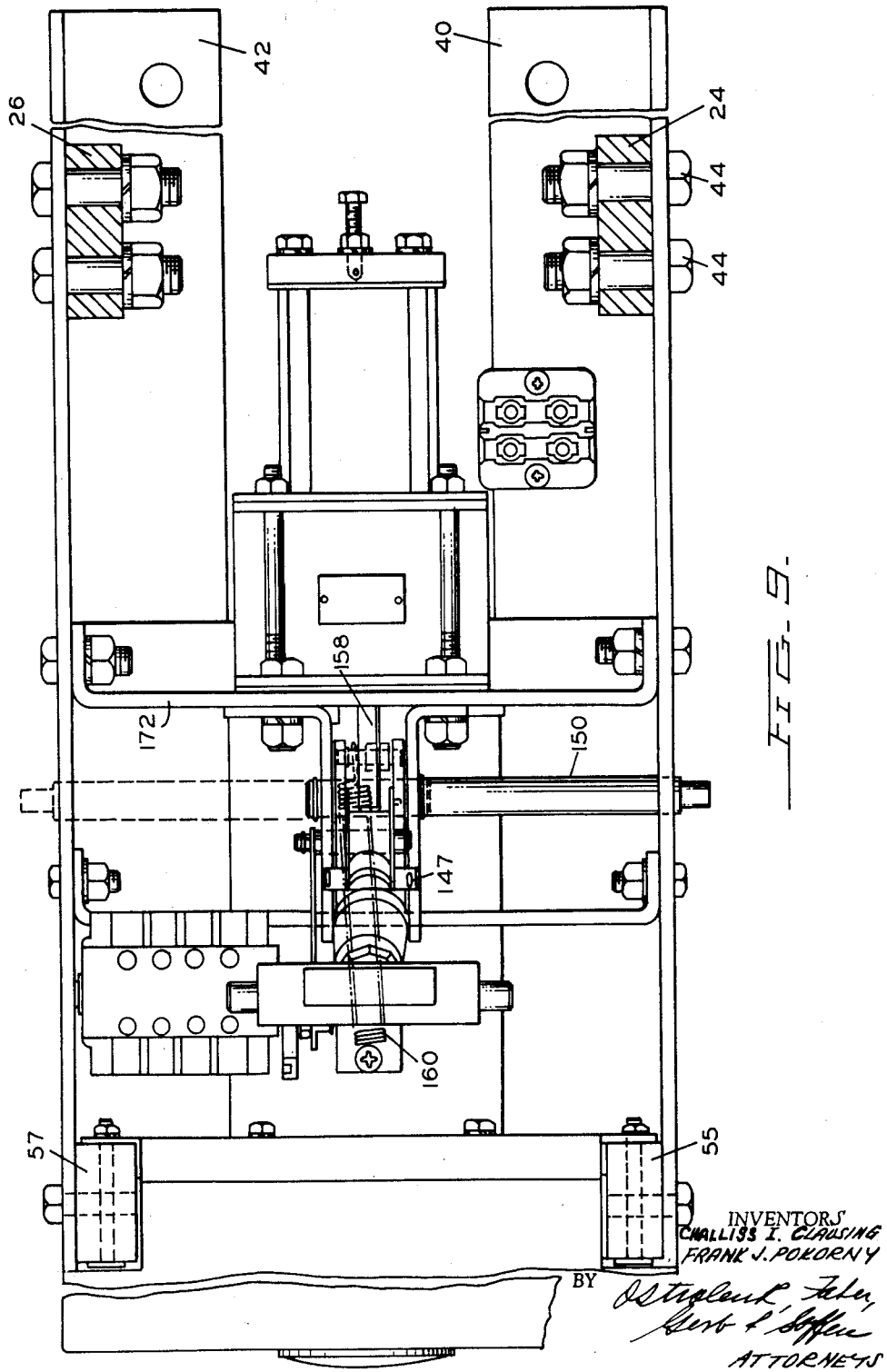

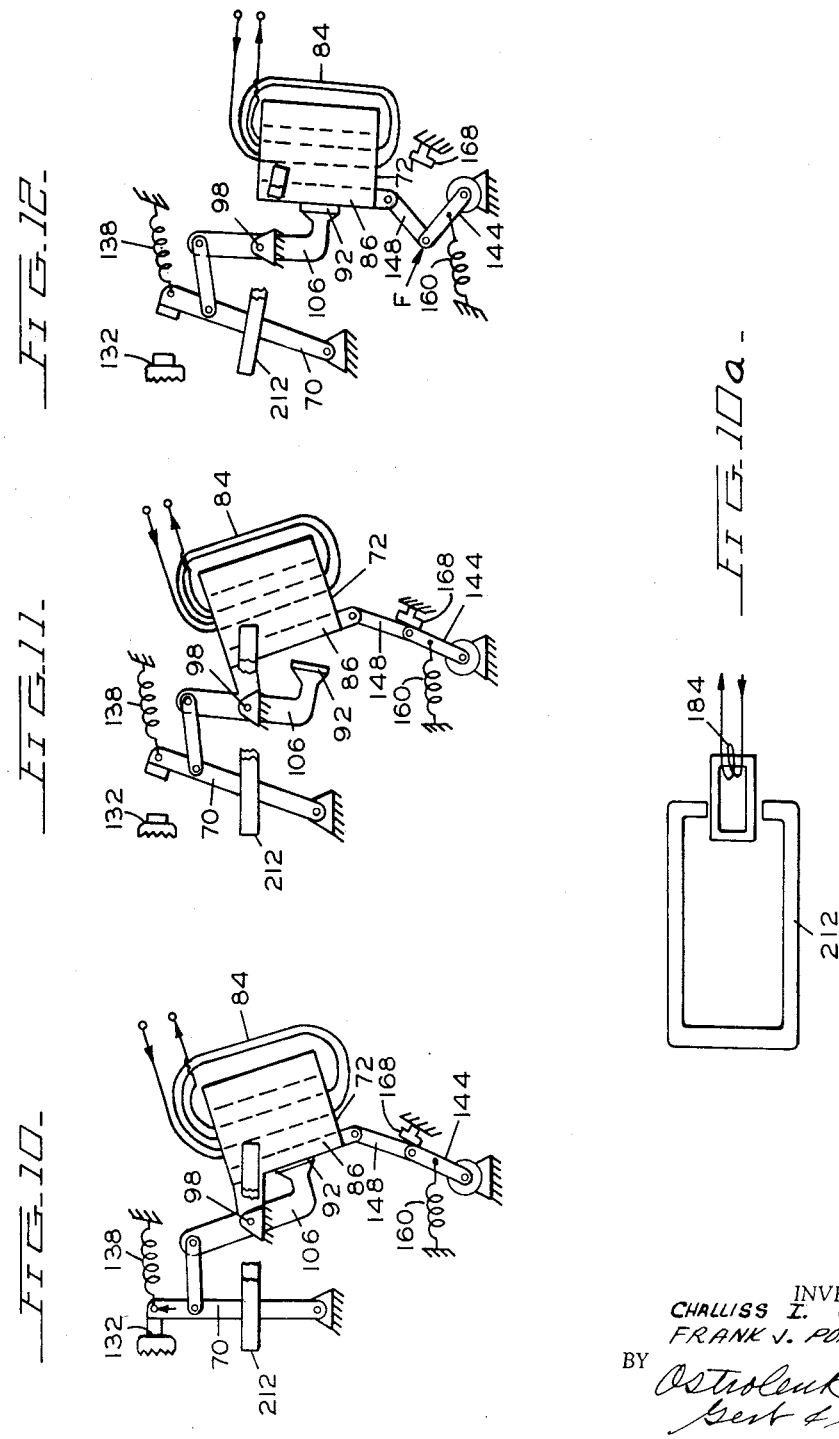

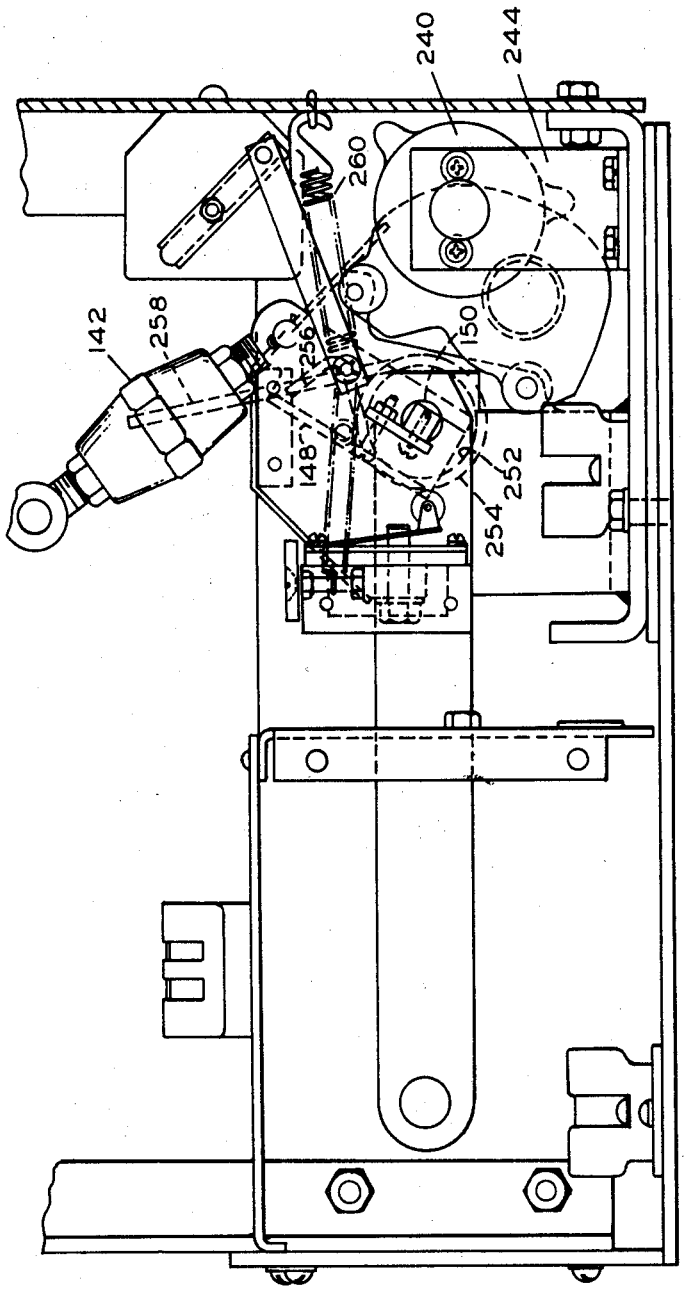

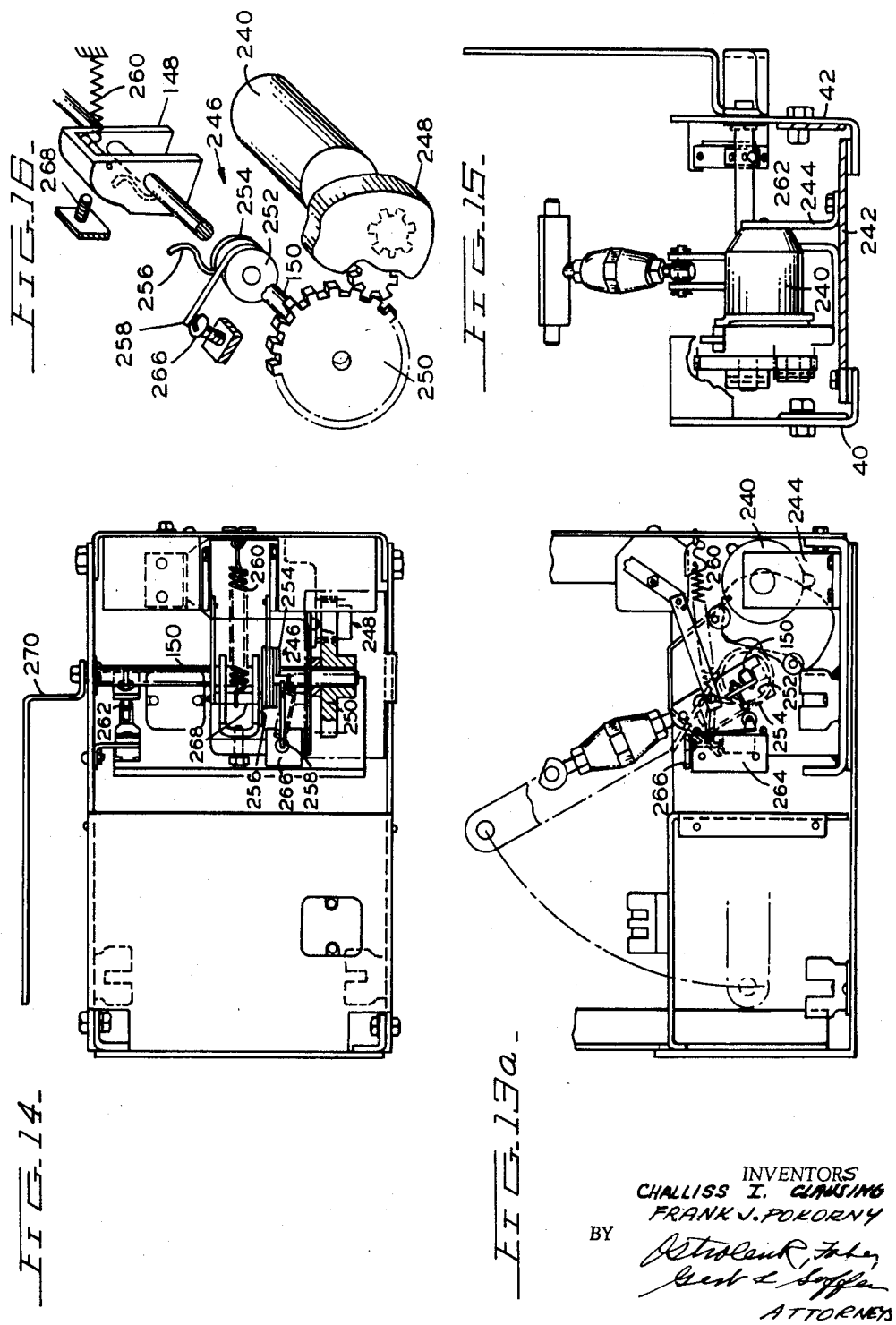

United States Patent Office 2,939,930
Patented June 7, 1960

2,939,930

MOTOR CLOSING MECHANISM FOR CIRCUIT BREAKERS

Challiss I. Clausing, Collingswood, N.J., and Frank J. Pokorny, Hatboro, Pa., assignors to I-T-E Circuit Breaker Company, Philadelphia, Pa., a corporation of Pennsylvania Filed May 22, 1957, Ser. No. 660,982

9 Claims. (Cl. 200—92)

This invention relates to a motor closing mechanism for circuit breakers and more specifically relates to a motor closing mechanism having a mechanical clutch interposed between a unidirectional motor and the contact operating mechanism.

Our novel motor closing mechanism is particularly well adapted for operation in high speed circuit breakers of the type shown in copending application Serial No. 660,970 filed May 22, 1957, entitled "High Speed Circuit Breaker" to Challiss I. Clausing and assigned to the assignee of the instant invention, now Patent No. 2,891,123, granted June 16, 1959, wherein an over-center toggle system is used as the output of the motor operated mechanism, this toggle system forming a latch for the circuit breaker contacts when they are driven to their engaged position. By connecting our novel clutch device between the toggle mechanism (or any other type of drive mechanism which operatively connects the motor output to the circuit breaker contacts), and the motor, the motor is allowed to coast after de-energization thereof without affecting the closing operation of the circuit breaker.

Furthermore, when utilizing our novel motor closing mechanism in high speed breakers of the type set forth in the above noted copending application Serial No. 660,-970, the motor will automatically provide a slow resetting operation of the polarizing magnet of the magnetic latch against its cooperating armature which is operatively connected to the contacts. This slow resetting operating, as will be described hereinafter, is necessary to prevent damage between the polished surfaces of the polarizing magnet and armature and further allow operation of anti-rebound means connected to the magnet.

Our novel clutch may be either of the automatically disengaging type set forth in copending application Serial No. 655,688 filed April 29, 1957 entitled "Overrunning Spring Clutch" to Challiss I. Clausing and Anthony P. Romano and assigned to the assignee of the instant invention, an electromagnetic clutch, or could be of the slip type wherein the cooperating clutch members slip with respect to one another for torques above a predetermined value.

When utilizing the spring type of clutch, the spring clutch member will normally operatively connect the output of the unidirectional motor to the toggle linkage which is in turn operatively connected to the cooperating contacts. Thus, energization of the unidirectional motor will drive the toggle linkage towards its over-center position and the cooperating contacts towards their engaged position. Once the toggle achieves its over-center and latching position, a protruding end of the spring clutch may engage an adjustable stop member whereby the spring is unwound and the clutch is in effect disengaged so that continued rotation of the motor will not transmit a driving force to the toggle linkage, the motor being de-energized in any convenient manner.

During operation of the circuit breaker, the circuit breaker contact may operate independently of the toggle linkage through a trip free mechanism of the type set forth in our above noted copending application Serial No. 660,970 whereby the toggle linkage is reset with a time delay which is given by the resistance of the unidirectional motor and its output gearing to a reset means operatively connected to the toggle. Hence, the toggle will be slowly reset with the motor operating as a brake and the spring clutch joining the toggle and the motor will be reengaged since the spring will be allowed to contract and achieve its clutching position. Once the mechanism is reset, it is clear that re-energization of the unidirectional motor will once again achieve a closing operation of the circuit breaker.

Hence, our novel motor operated mechanism may be conveniently substituted for any existing drive mechanism for circuit breakers since the presently used over-center toggle mechanism may be retained. Furthermore, the clutch which is interposed between the toggle mechanism and the motor will allow for coasting of the motor and will also provide a slow reset operation of the toggle linkage after operation of the circuit breaker.

It is to be noted that the motor current drain will be low as compared to an equivalent solenoid operating mechanism while the circuit breaker contact closing speed at the instant the contacts engage is equivalent to the fast make operation of solenoid operated contacts.

Accordingly, a primary object of our invention is to provide a novel motor closing mechanism for circuit breakers.

Another object of our invention is to provide a novel motor closing mechanism for circuit breakers which utilizes a unidirectional motor.

Still another object of our invention is to provide a novel motor closing mechanism for circuit breakers which utilizes a clutch device which operatively connects the motor output to the circuit breaker operating linkages.

A further object of our invention is to provide a novel motor operated mechanism which utilizes an automatically disengageable clutch connected to the output of a unidirectional motor wherein presently used over-center toggle systems of high speed circuit breakers may be retained.

Yet another object of our invention is to provide a novel motor closing mechanism for circuit breakers wherein a clutch is connected to the output of the motor to allow for coasting of the motor after energization thereof without affecting the closing operation of the circuit breaker.

A still further object of our invention is to provide a novel motor closing mechanism for circuit breakers wherein the motor provides a slow resetting operation for the circuit breaker closing mechanism.

These and other objects of our invention will become apparent from the following description when taken in conjunction with the drawings in which:

Figure 1a shows the structure of Figure 1 in conjunction with a solenoid type operating mechanism in a partially plan and partially sectional side view.

Figure 2 is a more detailed side view of the lower terminal assembly of Figures 1 and 1a.

Figure 3 is a top view of Figure 2.

Figure 4 is a cross-sectional view of the polarizing magnet structure of the magnetic latch.

Figure 5 is a more detail side view of the upper terminal structure of Figures 1 and 1a.

Figure 6 is a top view of Figure 5.

Figure 7 is a side view of Figure 5.

Figure 8 is a more detailed side view of the solenoid actuated operating mechanism of Figures 1 and 1a.

Figure 8a is a side cross-sectional view of the solenoid mechanism of Figure 8.

Figure 9 is a top view of Figure 8.

Figure 1:
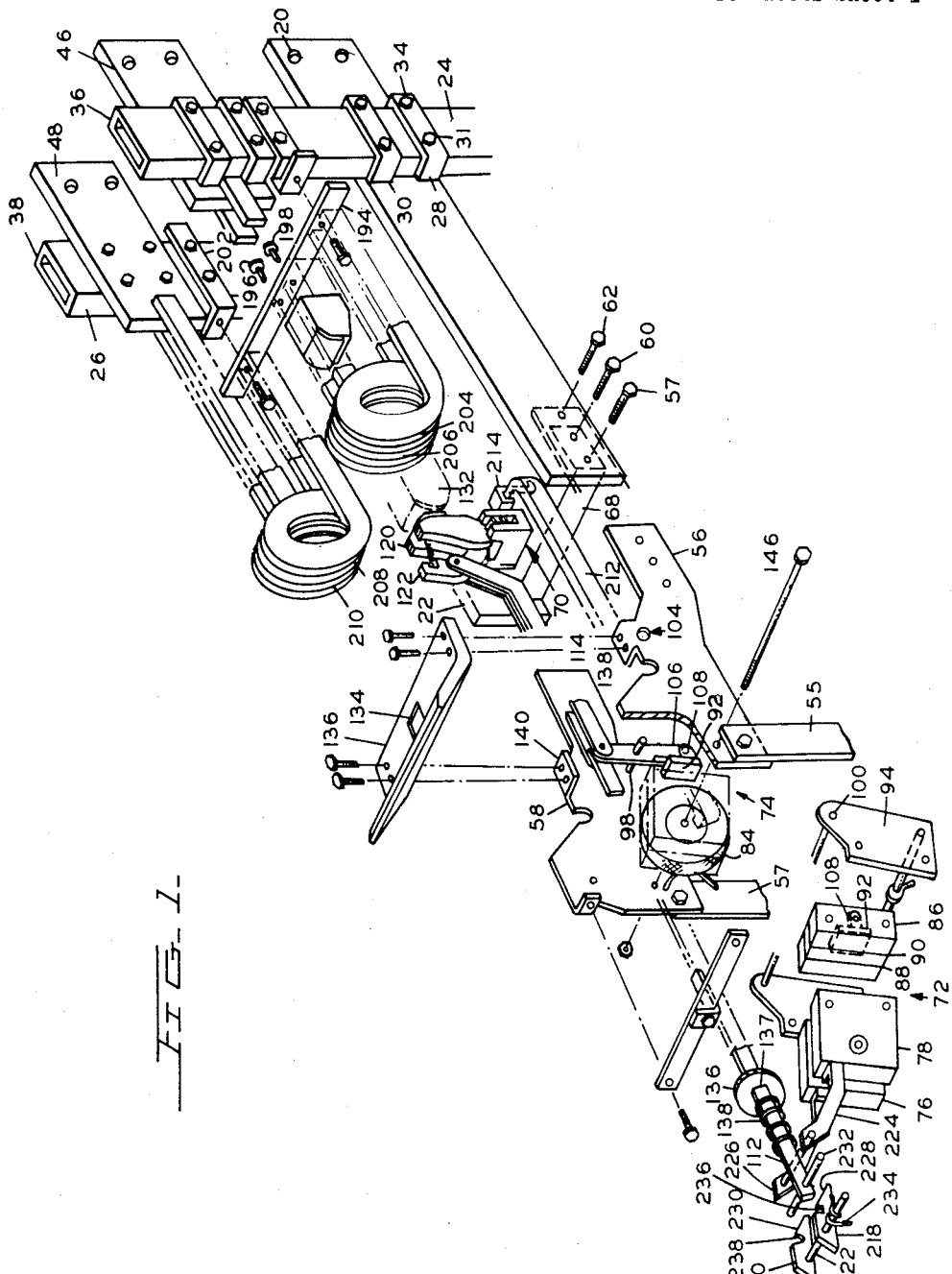
Figure 1 shows an exploded perspective view of a high speed circuit breaker utilizing a magnetic latch structure and polarizing coil structure.

Figure 10 schematically illustrates the novel magnetic latch with the cooperating contacts in their engaged position.

Figure 10a shows a top view of the magnetic shunt of Figure 10.

Figure 11 is similar to Figure 10 and illustrates the magnetic latch being unlatched responsive to a fault condition.

Figure 12 is similar to Figure 11 and shows the polarizing magnet being reset after the cooperating contacts have been disengaged.

Figure 13 shows a side view of our novel motor operating mechanism using a spring clutch for use in place of the toggle operating mechanism of Figure 1a with the motor operating mechanism in the disengaged position.

Figure 13a shows the mechanism of Figure 13 when in the engaged position.

Figure 14 is a top view of Figure 13a.

Figure 15 is a side view of Figure 13a.

Figure 16 is an exploded perspective view of motor and clutch mechanism of Figures 13a, 14 and 15.

Referring first to Figures 1 and 1a which show one type of circuit breaker which could be adapted with our novel motor operating mechanism, it is seen that the lower terminals 20 and 22 (Figure 3) are fastened to support posts 24 and 26 respectively by the bracket means 28—30 and a similar bracket means including bracket 32 of Figure 3 and a bracket not shown, respectively. These bracket assemblies, as may best be seen in Figure 3 for the case of bracket 28, are fastened to their respective lower terminals such as terminal 20 by the nut and bolt means 31 and 34.

As best seen in Figures 1a, 8 and 9, the support posts 24 and 26 are comprised of structural members encased in insulating sheaths 36 and 38 respectively (Figure 1), with the support posts 24 and 26 being rigidly connected to lower angle supports 40 and 42 respectively by bolt means such as the bolt means 44 shown for the lower angle support 40 and its cooperating support posts 24.

The upper terminals 46 and 48 as best seen in Figures 1, 1a and 6 are similarly supported from support posts 24 and 26 having the insulating sheaths 36 and 38 thereon by the bracket means 50—52 corresponding to terminal member 46 and a similar pair of brackets such as brackets 54 of Figure 6 and a second bracket not shown for the upper terminal 48. Clearly the brackets associated with terminal members 46 and 48 are constructed in a manner identical with that set forth for bracket 28 of Figure 3.

A first and a second saddle-shaped support member 56 and 58 best seen in Figures 1, 1a and 2 are then rigidly connected to lower terminals 20 and 22 by the bolt means such as bolts 57, 60 and 62 shown for the case of lower terminal 20 and saddle support member 56 of Figure 1.

As seen in Figure 3, a similar bolt arrangement including bolts 64, 66 and 70 serve to rigidly connect saddle member 58 to lower terminal 22. The bolts 57, 60, 64 and 66 further serve to rigidly connect a conductive bridge member 68 (Figures 1, 1a and 2) which electrically ties the lower terminals 20 and 22 together and further serves as a terminal for the movable contact structure 70, to be described more fully hereinafter.

The front ends of saddle support members 56 and 58 are supported from support posts 55 and 57 respectively (Figures 1, 1a and 9), which are carried by lower angle supports 40 and 42 respectively.

Accordingly, it is seen that the upper and lower terminals 46—48 and 20—22 respectively, and saddle support members 56 and 58 are supported from lower angle supports 40—42 by support posts 24, 26, 55 and 57.

The saddle support members 56 and 58 serve as a means to mount the magnetic latch structure 72 seen in Figure 1, as an exploded view, and seen in the assembled view in Figure 1 in dotted lines at location 74.

The novel latch structure of copending application Serial No. 660,970 as seen in Figures 1, 1a and 2 and 4, comprises a pair of side plates 76 and 78 positioned adjacent either side of the magnetic core member 80 (Figure 4) and fastened thereto by the fastening nut and bolt arrangement 82. A polarizing coil 84 energized from leads 87 and 88 (Figures 1a and 2) then encompasses the magnetic core member 80 so as to drive a magnetic flux therethrough responsive to energization of the coil 84. The magnetic flux path of the magnet is completed by a front plate 86 which is fastened to the side plates 76 and 78 in any desired manner, as by bolts 75, 77, 79 and 81.

If desired, this front plate 86 of Figures 1 and 4 may be constructed to have non-metallic segments such as segments 88 and 90 interposed between adjacent magnetic segments as seen in Figure 1.

The armature member 92 is then seen in Figures 1, 1a and 2 as being positioned to move into and out of engagement with the surface of front plate 86 which is away from the side plates 76 and 78. The armature member 92 which, as will be presently seen, is operatively connected to the movable contact of the circuit breaker, may be constructed to have magnetically insulating sections similar to sections 88 and 90 of the front plate 86 wherein the non-magnetic portions of the armature member are in alignment with the magnetic portions of the face plate 86.

Accordingly, the magnetic flux path which will interlink the armature and the face plate 86 will be forced to enter the armature and the cooperating magnet surface at a plurality of positions to thereby cause a greater number of flux linkages to exist between the armature and the face plate of the magnet assembly. This would then mean that there would be a stronger sealing force between the magnet and its cooperating armature and further than once the armature begins to leave the surface of the magnet, the air gap between the armature and the magnet is increased by the number of times that the magnetic flux enters and leaves the armature. Thus, the air gap will be rapidly increased and the magnetic attraction between the armature and magnet will rapidly decrease so as to allow extremely rapid movement of the armature to disengaged position.

As best seen in Figure 4, the magnetic plates 76, 78, 86, the core member 80 and polarizing coil 84 are rigidly connected as a unit hereinafter to be called the polarizing magnet of the magnetic latch structure. This polarizing magnet has a pair of side plates 94 and 96 attached thereto as best seen in Figures 1, 2, 3 and 4, these side plates providing means for pivotally mounting the magnet assembly as seen in Figures 2 and 3 by shaft 98 which cooperates with apertures 100 and 102 of side plates 94 and 96 seen in Figures 1 and 4. Clearly, the pivotal mounting shaft 98 is supported from apertures in saddle support members 56 and 58, one such aperture being seen as aperture 104 in saddle support member 58 of Figure 1.

The pivotal mounting shaft 98 further acts to pivotally support a walking beam 106 which is best seen in Figures 1 and 2. Walking beam 106 has the armature member 92 pivotally connected to one end thereof by means of the protruding ear 108 of armature 92 which has an aperture therein which passes a pivotal mounting pin 110 (Figure 2) through a cooperating aperture at the bottom of walking beam 106.

Accordingly, it is seen that the magnet assembly 72 of Figures 1 and 2 as well as the armature 92 which is fastened to walking beam 106 are pivotally mounted on a common pivotal shaft which is supported from the saddle support members 56 and 58.

The upper end of walking beam 106 is pivotally mounted to one end of each of opening spring shaft 112 which carries a relatively powerful opening spring 138 and movable contact shaft 114 which is operatively connected to movable contact assembly 70.

The movable contact assembly 70 may be of any desired type well known in the art and in the case of the instant application is comprised of a first contact portion 116 having contact surfaces 118 and 120 and a back-up biasing member 122. Each of members 116 and 122 are pivotally mounted on a contact block 124 as seen in Figures 1 and 2 by means of a pivotal mounting pin 126 which is biased into a U-shaped receiving portion of contact block 124 by the biasing spring 128. The contact block 124 is then electrically and mechanically connected to the conductor 68 which in turn is electrically and mechanically connected to the lower terminal members 20 and 22.

The function of the back-up member 122 is to bring the biasing force of biasing springs such as spring 130 into play to resiliently force the contact surfaces 118 and 120 into contact engagement with the cooperating stationary contact surfaces of the stationary contact 132 of Figures 1, 1a, 5 and 6 when the movable contact is moved to the engaged position.

It is to be noted that walking beam 106 passes through an aperture 134 in V-shaped structural member 136. Structural member 136 bridges the saddle support members 56 and 58 and is connected to flanges 138 and 140 of the saddle support members 56 and 58 respectively, as seen in Figure 1. The opening spring shaft 112 passes through a cut-away portion 137 of the V-shaped support member 136 as seen in Figures 1 and 2 and the portion of shaft 112 behind member 136 supports the opening spring member 138 which is contained between a collar 141 (Figure 3) and the back surface of structural member 136.

Hence, when the walking beam 106 is rotated in a counterclockwise direction, the movable contact assembly will be rotated about pivot point 126 to a disengaged position and collar 141 of shaft 112 will be moved backwards to allow extension of compression spring 138. When, however, walking beam 106 is rotated in a clockwise direction, spring 138 will become charged because of the rightward motion of shaft 112 and collar 141 with respect to member 136, and the movable contact assembly 70 will be rotated in a clockwise direction and into an engaged position with respect to the stationary contact 132 of Figures 1 and 1a.

Accordingly, the armature member and the polarizing magnet for the armature member are independently rotatable with respect to one another.

Thus, as will be seen hereinafter, when the contact mechanism is in its disengaged position and the armature members sealed thereto, an operating mechanism may be connected to the polarizing magnet to drive the polarizing magnet in a clockwise direction. This will then force the walking beam 106 to be rotated in a clockwise direction to thereby move the cooperating contacts to their engaged position against the biasing force of the opening spring 138. When, however, the magnetic flux between the polarizing coil and the armature is decreased and the force of spring 138 is sufficient to pry the armature 92 away from the polarizing magnet, then the contact assembly 70 will be driven to its disengaged position by means of the force of biased spring 138 independently of the polarizing magnet and the operating means attached thereto. This action then imparts trip-free characteristics to the circuit breaker without requiring a relatively complex trip-free mechanism in the operating mechanism.

Hence, the operating mechanism may be of simple construction as that shown in Figures 1a, 8 and 9. More specifically, the operating mechanism of Figures 1a, 8 and 9 comprises a toggle assembly which includes adjustable link 142 which has a screw connection 144 connectible to shaft 146 supported by side plates 94 and 96 of the closing magnet as seen in Figures 1 and 2. This connection is best seen in Figure 1a which shows the complete assembly of the operating mechanism and magnetic latch mechanism.

Toggle link 142 is pivotally connected to a second toggle link 148 by pin 147 as seen in Figures 8 and 1a, the toggle link 148 being pivotally mounted on a shaft 150 as seen in Figures 8 and 9. The shaft 150 is then supported from support angle members 40 and 42 in the manner shown in Figure 9.

A first portion of toggle member 148 supports a pin 152 which is pivotally connected to one end of connecting link 154. The other end of link 154 is pivotally connected to solenoid plunger extension 156 by means of the pin 158 carried by the solenoid plunger extension 156.

The lower end of toggle member 148 is biased to rotate in a clockwise direction about shaft 150 by biasing spring 160 which is attached to structural member 162. The lower end of toggle link 148 is further positioned to move in cooperating relationship with respect to a roller 164 of the microswitch 166 which operates to deenergize the solenoid energizing circuit responsive to operation thereof as will be described hereinafter.

An adjustable stop member 168 is then positioned in cooperating relationship with respect to a flange 170 of link 148 as seen in Figure 8, this stop mechanism checking the motion of toggle links 142 and 148 once the solenoid plunger 156 positions them in the over-center position shown in Figures 8 and 1a.

The solenoid mechanism is connected to structural member 172 of Figures 8 and 9 and is best seen in Figure 8a as comprising a magnetic plunger portion 174 which moves within an energizing coil (not shown) in a manner well known in the art.

A dash-pot action is imparted to plunger 174 by means of the piston member 176 connected to the right hand end of plunger 174 in Figure 8a. This piston member 176 moves within a cylinder 178 which is enclosed by an end member 180 having an air valve 182 therein which is adjusted by the screw means 184, the air valve 182 controlling the motion of plunger 174 under any given force.

Figure 8 further shows a link 186 having one end pivotally connected at pin 152 and its other end pivotally connected to link 188 by pin 190. Thus the link 188 may control auxiliary switches or an indicating mechanism positioned within indicating block 192 which gives a visual indication of the position of the circuit breaker operating mechanism.

Returning now to Figures 1, 1a, 5, 6 and 7, it is seen that the circuit breaker current path includes terminals 20 and 22 which are connected to the common conductive member 68, the movable contact structure 70, and the stationary contact structure 132. The stationary contact structure 132 is, as best seen in Figures 1 and 6, fastened to a conductive bar 194 by means of bolts 196 and 198 and the conductive member 194 is mechanically supported from support posts 24 and 26 by the angles 200 and 212 best seen in Figure 1. Angles 200 and 202 are further seen in Figures 1, 5 and 7 as being carried by the support structures 24 and 26 by a bracket arrangement similar to that set forth above in Figure 3 for bracket arrangement 28.

One end of each of two-turn blow-out coils 204, 206, 208 and 210 which will be described in more detail hereinafter, is connected to conductive member 194 and the opposite end of blow-out coils 204 and 206 are connected to upper terminal 46 while the upper end of blow-out coils 208 and 210 are connected to upper terminal member 48.

Thus the complete current circuit from stationary contact 132 will include conductive bar 194, blow-out coils 204, 206, 208 and 210, and upper terminals 46 and 48.

It is necessary that a magnetic flux be generated in the magnetic latch structure which is proportional to or functionally related to the current in the circuit breaker circuit. This may be done by taking a bucking bar which is a current conductor directly through the magnetic circuit, thus immobilizing the magnet portion of the magnetic circuit and increasing the length of the current path. In accordance with the above noted application Serial No. 660,970, however, a magnetic shunt 212 is provided which is fastened to conducting member 68 by the bracket means 214 as seen in Figures 1, 2 and 3, the bracket member 214 being fastened to conducting member 68 by the bolt 216. As best seen in Figure 3, the magnetic shunt which is an open ring of magnetic material surrounds the stationary part of the moving contact structure 70 and terminates on either side of the magnetic latch at the position of front plate 86 of Figure 4. Hence, a magnetic flux will be generated through the plate 86 of Figure 4 in accordance with the current magnitude flowing through the circuit breaker contacts.

This flux will normally aid the flux generated by polarizing coil 84 in maintaining armature 92 sealed to the surface of magnetic plate 86. When, however, this flux is reversed or altered in some predetermined manner, the flux holding the armature 92 in its sealed position will be decreased to thereby allow the armature to be pried away from its sealed position by the opening spring 138 as seen in Figures 1 and 2.

Thus, the magnetic latch is an extremely compact and easily manufactured device, and further allows the use of a relatively short current path for the circuit breaker components. Furthermore, the magnet is movable with respect to magnetic shunt 212 since it is positioned in an air gap of the shunt.

As previously set forth, the magnetic latch allows the use of highly desirable anti-bounce means, this being shown in Figures 1 and 2, as comprising the open latch members 218 and 220 which are pivotally mounted on shaft 222 which is supported by extending arms 224 and 226 which are rigidly connected to magnet plates 76 and 78 respectively.

It is further seen that the open latch plates 218 and 220 have downwardly sloped engaging surfaces 228 and 230 respectively which are positioned to be engageable with respect to pin 232 carried by shaft 112 of the opening spring mechanism. Furthermore, the open latch members 218 and 220 are biased in a counterclockwise direction by means of a biasing spring 234.

The operation of the high speed circuit breaker heretofore described may now be given in the following in conjunction with the schematic illustrations of Figures 10, 10a, 11, and 12.

Assuming that the circuit breaker is in the engaged position as shown in Figures 1a and 10, it is seen that the toggle links 144 and 148 of the operating mechanism have been driven to the over-center position shown so that the toggle link 148 lies against the stop member 168. This will maintain the polarizing magnet 72 in the position shown in Figure 1a and since the armature 92 is sealed to the polarizing magnet 72, the latch force of the toggle linkage is transmitted directly to the walking beam 106 and the movable contact assembly 70 whereby the movable contact assembly is maintained in an engaged position with respect to stationary contact 132 against the force of opening spring 138.

The current through the movable contact assembly 70 will generate a flux in the magnetic shunt 212 (see Figure 10a) which is impressed upon the polarizing magnet (seen in dotted lines in Figure 10a) so as to aid the flux of the polarizing coil 84 in keeping armature 92 sealed to the polarizing magnet. When, however, the current through the movable contact reverses and the flux in magnetic shunt 212 similarly reverses the sealing force between armature 92 and the polarizing magnet is weakened and the opening spring 138 will drive the walking beam 106 in a direction to pry the armature 92 away from its magnet and to drive the movable contact structure to a disengaged position as seen in Figure 11.

As the opening spring shaft 112 reaches the end of its motion, the pin 232 of Figures 1 and 2 will pick up the surfaces 228 and 230 of the open latch members 218 and 220 respectively to rotate them in a clockwise direction about their pivotal mounting shaft 222 and against the biasing force spring 234.

As the shaft 112 continues to move, the pin 232 will reach the notches 236 and 238 in members 218 and 220 respectively, whereby the biasing force of spring 234 will quickly rotate the members 218 and 220 in a counterclockwise direction to firmly seat pin 232 in notches 236 and 238 as seen in the dotted lines in Figure 2.

It is to noted that magnet structure 72 will still be in the position shown in Figures 1 and 1a and 11 since the speed of resetting magnet 72 is extremely slow when compared to the speed of operation of the movable contact assembly under the driving force of spring 138.

Hence, when the shaft 112 of Figures 1 and 2 reaches the end of its stroke, it will be firmly engaged by the anti-bounce mechanism including members 218 and 220 and it will not be possible for the movable contact assembly to rebound towards an engaged position because of the mechanical interlock between pin 232 and notches 236 and 238.

After the contact assembly has been moved to its disengaged position and the anti-rebound mechanism has firmly locked the movable contact assembly against rebound, the magnet assembly 72 will be slowly rotated about its pivotal mounting shaft 98 under the biasing force of reset spring 160 (Figures 8 and 1a) which is attached to the lower end of toggle link 148 toward the reset position of Figure 12. As this magnet assembly 72 is slowly reset, it is seen that notches 236 and 238 will be moved out of engagement with pin 232 of contact shaft 112, the contact mechanism being maintained in the disengaged position by virtue of biasing action of spring 138 against plate 136.

The rate at which spring 160 will move the magnet assembly 72 to a reset position is given by the adjustment of valve 182 of the dash-pot solenoid mechanism of Figure 8a. Thus the magnet assembly can be made to reset as slowly as desired in order to allow the anti-rebound mechanism to latch the contact link 112 against rebound after the initial opening interval and prior to the engagement of the anti-rebound mechanism, and also to allow a slow engagement between the cooperating surfaces of armature 92 and face plate 86 of polarizing magnet 72.

The polarizing magnet 72 will finally reach the reset position of Figure 12 and the polarizing flux of coil 84 will once again cause the armature member 92 to be sealed against the polarizing magnet structure.

In order to reclose the circuit breaker, it is only necessary to apply a closing force to the toggle linkage of Figure 12 as indicated by arrow F. In the particular embodiment set forth herein, the solenoid means of Figure 8a is energized through any desired energizing circuit (not shown), whereupon the solenoid plunger 174 will be driven to the left in Figure 1 and the plunger 156 which is connnected to link 148 by pin 152 will cause the toggle mechanism to be driven towards the position shown in Figures 8 and 10. The polarizing magnet and armature which are magnetically sealed to one another will drive the contact assembly to its engaged position.

Once the toggle mechanism including toggle links 142 and 148 assume their over-center position of Figure 10, the lower end of toggle link 148 will engage roller 164 of microswitch 166 of Figure 8 to cause de-energization of the solenoid energizing circuit and the circuit breaker will be maintained in its engaged position in view of the latching action of the over-center toggle. If, however, the circuit breaker is engaged against a fault condition, the armature 92 will be released from its cooperating magnet because of the flux change in magnetic shunt 212 and the circuit breaker contacts will be disengaged independently of the operating mechanism position.

Hence the magnetic latch unit achieves trip-free characteristics independently of the operating mechanism construction.

Figures 1a, 8 and 9 show a solenoid actuating mechanism, but as will be illustrated in Figures 10, 10a, 11 and 12, this solenoid mechanism can be replaced by our novel motor mechanism.

Our novel motor operating mechanism is set forth in Figures 13, 13a, 14, 15 and 16 and utilizes the same basic toggle operating mechanism as was utilized in the case of Figure 8. Thus, the toggle links 142 and 148 perform the same function as was performed in the case of Figure 8.

In the case of the motor operated device, however, the shaft 150 which pivotally supports toggle link 148 is connected to a unidirectional drive motor 240 which, as is best seen in Figures 15 and 16, is supported from the base frame member 242 by a bracket means such as bracket 244, and other support structures not shown, through a spring clutch device seen generally at 246.

More specifically, the output of motor 240 is taken through a gear box 248 which is connected to a gear member 250 (see Figures 14 and 16) which is rigidly fastened to the shaft 150. Thus, energization of unidirectional motor 240 will cause a rotation of shaft 150 through the gear 250. Shaft 150, as best seen in Figures 13 and 13a, which show the operating mechanism in the engaged and disengaged position respectively, and Figure 16 has a bushing 252 keyed thereon over which a spring 254 is wound in frictional engagement with the outer diameter of bushing 252.

The toggle link 148, which in the case of Figures 13, 14, 15 and 16 is rotatable with respect to shaft 150 as contrasted to the construction of Figure 8 where there was a rigid connection, is operatively connected to shaft 150 through spring end portion 256, as seen in Figures 13, 14 and 16. The other end 258 of spring 254 extends outwardly from the shaft, as seen best in Figures 13, and 16.

In operation, when going from the disengaged position of Figure 13 to the engaged position of Figure 13a, the motor 240 is energized through a motor energizing circuit (not shown) so that gear 250 (Figures 14 and 16) will drive shaft 150 in a counterclockwise direction. Since the clutch comprising spring 254 is frictionally engaged with the bushing 252, there will be an operative connection between shaft 150 and toggle link 148 because of the connection of spring end 256 to the toggle link 148.

Hence, the toggle linkage, including links 148 and 142, will be straightened out and eventually brought to their over-center position against the biasing force of reset spring member 260.

Once the toggle linkage has reached the over-center position, an adjustable screw member 262 attached to shaft 150 and best seen in Figures 14 and 15 will engage the roller of microswitch 264 to de-energize the motor circuit. However, the motor still rotates because of its inertia, and in order to prevent this energy from being transmitted to the linkages and causing a subsequent breakage of the links, an adjustable clutch disengaging member 266 picks up the end 258 of spring 254 to unwind the spring and thereby operatively disconnect spring 254 and the bushing 252 around which it is wound.

This, in essence, causes a disengagement between the motor 240 and the toggle link 148 so that continued rotation of motor 240 is not transferred to the toggle linkage.

The toggle linkage then is set in its over-center position and against stop member 268, as best seen in Figure 14 and the circuit breaker contacts connected to the output link 142 are latched in their engaged position because of the over-center position of the toggle.

In moving from the engaged position to the disengaged position, this novel clutch interconnection further serves to delay the movement of the polarizing magnet portion of the magnetic latch, as was done in Figure 8 by the solenoid dash-pot operation.

It is to be noted that this delayed reset of the polarizing magnet is necessary, first, to allow the anti-rebound mechanism to operate when the movable contact reaches the end of its disengaging stroke and, secondly, so as to allow a gradual re-engagement between the polarizing magnet and its cooperaing armature so that their accurately polished surfaces will not be damaged during the reset operation. This is accomplished in Figures 13, 13a, 14 and 15 as follows:

When the armature is pried away from the polarizing magnet with the contacts in their engaged position, the reset spring 260 will tend to collapse the toggle links 142 and 148. The projecting end 256 of spring 254 is rotated in a clockwise direction from the position of Figure 13a toward the position of Figure 13 whereupon the bushing 252 and spring 254 are reengaged. Thus, the toggle link 148 is once again connected to the motor 240 through the disengageable clutch shaft 150 and the gear reduction mechanism 248.

This large gear reduction mechanism will act as a time delay for the reset action. That is to say, the frictional force of the motor is amplified by the gear reduction mechanism so as to serve as an opposing force to the reset action of the toggle linkage against the force of spring means 260.

In view of the foregoing, it is seen that our novel motor operated mechanism having a clutch means connected to the output thereof is easily adaptable to existing circuit breaker mechanisms of the magnetic latch type as well as any other type. The clutch allows the motor to drive the contacts closed, and after de-energization of the motor, the clutch allows the motor to coast without affecting the operating linkage. The motor then further operates as a brake to delay the resetting of the operating linkage after the circuit breaker contacts have been disengaged.

Although we have described preferred embodiments of our novel invention, many variations and modifications will now be obvious to those skilled in the art, and we prefer therefore to be limited not by the specific disclosure herein but only by the appended claims.

We claim:

1. A motor closing mechanism for a circuit breaker; said circuit breaker having a pair of cooperable contacts movable between an engaged and a disengaged position and a closing mechanism operatively connected to at least one of said pair of cooperable contacts for moving said cooperable contacts between said engaged and disengaged position; said motor closing mechanism comprising a motor, a driving member and a driven member; said driving member being operatively connected to the output of said motor, said driven member being operatively connected to said closing member; a clutch; said driving and driven members being operatively connected to one another by said clutch to form an operative connection between said motor output and said operating mechanism for driving said cooperating contacts to their engaged position, said clutch preventing the transmission of excess torque from said motor after said cooperating contacts are moved to said engaged position; said closing mechanism being movable to a reset position when said cooperating contacts are moved from said engaged position to said disengaged position; said clutch operatively connecting said motor and said closing mechanism when said cooperating contacts are moved to said disengaged position, said motor acting as a brake to time delay the resetting of said closing mechanism.

2. A motor closing mechanism for a circuit breaker; said circuit breaker having a pair of cooperable contacts movable between an engaged and a disengaged position and a closing mechanism operatively connected to at least one of said pair of cooperable contacts for moving said cooperable contacts between said engaged and disengaged position; said motor closing mechanism comprising a motor, a driving member and a driven member; said driving member being operatively connected to the output of said motor, said driven member being operatively connected to said closing member; a clutch; said driving and driven members being operatively connected to one another by said clutch to form an operative connection between said motor output and said operating mechanism for driving said cooperating contacts to their engaged position, said clutch preventing the transmission of excess torque from said motor after said cooperating contacts are moved to said engaged position; said clutch comprising an automatically disengaging spring clutch constructed to be disengaged when said cooperating contacts assume said engaged position, said spring clutch being engaged while said cooperating contacts are being moved to their said engaged position.

3. A motor closing mechanism for a circuit breaker; said circuit breaker having a pair of cooperable contacts movable between an engaged and a disengaged position and a closing mechanism operatively connected to at least one of said pair of cooperable contacts for moving said cooperable contacts between said engaged and disengaged position; said motor closing mechanism comprising a motor, a driving member and a driven member; said driving member being operatively connected to the output of said motor, said driven member being operatively connected to said closing mechanism; a clutch; said driving and driven members being operatively connected to one another by said clutch to form an operative connection between said motor output and said operating mechanism for driving said cooperating contacts to their engaged position, said clutch preventing the transmission of excess torque from said motor after said cooperating contacts are moved to said engaged position; said closing mechanism being movable to a reset position when said cooperating contacts are moved from said engaged position to said disengaged position; said clutch operatively connecting said motor and said closing mechanism when said cooperating contacts are moved to said disengaged position, said motor acting as a brake to time delay the resetting of said closing mechanism; said clutch comprising an automatically disengaging spring clutch constructed to be disengaged when said cooperating contacts assume said engaged position, said spring clutch being engaged while said cooperating contacts are being moved to their said engaged and disengaged position; said motor being a unidirectional motor.

4. In a motor closing mechanism for a circuit breaker; said circuit breaker comprising a relatively movable first contact and a relatively stationary second contact, said first contact being movable into and out of engagement with respect to said second contact, said first contact having a trip-free operating mechanism operatively connected thereto, said trip-free operating mechanism being drivable from a unidirectional operating motor to drive said first contact from said disengaged position to said engaged position; a clutch having a driving member and a driven member operatively connected to the output of said unidirectional motor and said trip-free operating mechanism respectively; said clutch being engaged when said unidirectional motor drives said trip-free operating mechanism to move said first contact to said engaged position, said clutch preventing the transmission of force to said trip-free operating mechanism when said first contact reaches said engaged position.

5. In a motor closing mechanism for a circuit breaker; said circuit breaker comprising a relatively movable first contact and a relatively stationary second contact, said first contact being movable into and out of engagement with respect to said second contact, said first contact having a trip-free operating mechanism operatively connected thereto, said trip-free operating mechanism being drivable from a unidirectional operating motor to drive said first contact from said disengaged position to said engaged position; a clutch having a driving member and a driven member operatively connected to the output of said unidirectional motor and said trip-free operating mechanism respectively; said clutch being engaged when said unidirectional motor drives said trip-free operating mechanism to move said first contact to said engaged position, said clutch preventing the transmission of excess force to said trip-free operating mechanism when said first contact reaches said engaged position; said trip-free operating mechanism being movable to a reset position when said first contact is moved from said engaged position to said disengaged position; said clutch being engaged when said first contact is moved toward said disengaged position; said unidirectional motor acting as a brake to time delay the resetting of said closing mechanism.

6. In a motor closing mechanism for a circuit breaker; said circuit breaker comprising a relatively movable first contact and a relatively stationary second contact, said first contact being movable into and out of engagement with respect to said second contact, said first contact having a trip-free operating mechanism operatively connected thereto, said trip-free operating mechanism being drivable from a unidirectional operating motor to drive said first contact from said disengaged position to said engaged position; a clutch having a driving member and a driven member operatively connected to the output of said unidirectional motor and said trip-free operating mechanism respectively; said clutch being engaged when said unidirectional motor drives said trip-free operating mechanism to move said first contact to said engaged position, said clutch preventing the transmission of force to said trip-free operating mechanism when said first contact reaches said engaged position; said clutch comprising an automatically disengaging spring clutch constructed to be disengaged when said first contact assumes said engaged position, said spring clutch being engaged while said first contact is being moved to said engaged position.

7. In a motor closing mechanism for a circuit breaker; said circuit breaker comprising a relatively movable first contact and a relatively stationary second contact, said first contact being movable into and out of engagement with respect to said second contact, said first contact having a trip-free operating mechanism operatively connected thereto, said trip-free operating mechanism being drivable from a unidirectional operating motor to drive said first contact from said disengaged position to said engaged position; a clutch having a driving member and a driven member operatively connected to the output of said unidirectional motor and said trip-free operating mechanism respectively; said clutch being engaged when said unidirectional motor drives said trip-free operating mechanism to move said first contact to said engaged position, said clutch preventing the transmission of excess force to said trip-free operating mechanism when said first contact reaches said engaged position; said trip-free operating mechanism being movable to a reset position when said first contact is moved from said engaged position to said disengaged position; said clutch being engaged when said first contact is moved toward said disengaged position; said unidirectional motor acting as a brake to time delay the resetting of said closing mechanism; said clutch comprising an automatically disengaging spring clutch constructed to be disengaged when said first contact assumes said engaged position, said spring clutch being engaged while said first contact is being moved to said engaged and disengaged position.

8. In a motor closing mechanism for a circuit breaker; said circuit breaker comprising a relatively movable first contact and a relatively stationary second contact, said first contact being movable into and out of engagement with respect to said second contact, said first contact having a trip-free operating mechanism operatively connected thereto, said trip-free operating mechanism being drivable from a unidirectional operating motor to drive said first contact from said disengaged position to said engaged position; a clutch having a driving member and a driven member operatively connected to the output of said unidirectional motor and said trip-free operating mechanism respectively; said clutch being engaged when said unidirectional motor drives said trip-free operating mechanism to move said first contact to said engaged position, said clutch preventing the transmission of excess force to said trip-free operating mechanism when said first contact reaches said engaged position; said trip-free operating mechanism including a magnetic latch having a polarizing magnet operatively connected to said clutch driven member and an armature magnetically sealable with respect to said polarizing magnet and operatively connected to said first contact; said polarizing magnet being movable to a reset position when said armature is released from said polarizing magnet and said first contact is moved from said engaged position to said disengaged position; said clutch being engaged when said first contact is moved toward said disengaged position, said unidirectional motor acting as a brake to time delay the resetting of said polarizing magnet.

9. In a motor closing mechanism for a circuit breaker; said circuit breaker comprising a relatively movable first contact and a relatively stationary second contact, said first contact being movable into and out of engagement with respect to said second contact, said first contact having a trip-free operating mechanism operatively connected thereto, said trip-free operating mechanism being drivable from a unidirectional operating motor to drive said first contact from said disengaged position to said engaged position; a clutch having a driving member and a driven member operatively connected to the output of said unidirectional motor and said trip-free operating mechanism respectively; said clutch being engaged when said unidirectional motor drives said trip-free operating mechanism to move said first contact to said engaged position, said clutch preventing the transmission of excess force to said trip-free operating mechanism when said first contact reaches said engaged position; said trip-free operating mechanism including a magnetic latch having a polarizing magnet operatively connected to said clutch driven member and an armature magnetically sealable with respect to said polarizing magnet and operatively connected to said first contact; said polarizing magnet being movable to a reset position when said armature is released from said polarizing magnet and said first contact is moved from said engaged position to said disengaged position; said clutch being engaged when said first contact is moved toward said disengaged position, said unidirectional motor acting as a brake to time delay the resetting of said polarizing magnet; said clutch comprising an automatically disengaging spring clutch constructed to be disengaged when said first contact assumes said engaged position, said spring clutch being engaged while said first contact is being moved to said engaged and disengaged position.

References Cited in the file of this patent

UNITED STATES PATENTS

| | | |
|---|---|---|
| 1,318,099 | Mortensen | Oct. 7, 1919 |
| 1,748,917 | Leake | Feb. 25, 1930 |
| 2,053,961 | Linde | Sept. 8, 1936 |
| 2,068,402 | Duffing et al. | Jan. 19, 1937 |
| 2,228,466 | Ludwig et al. | Jan. 14, 1941 |
| 2,282,007 | Smith | May 5, 1942 |
| 2,307,567 | Coggeshall et al. | Jan. 5, 1943 |